United States Patent [19]
Davis et al.

[11] 3,979,059
[45] Sept. 7, 1976

[54] SYSTEMS FOR CONTROLLING THE TEMPERATURE WITHIN AN ENCLOSURE

[76] Inventors: James Ralph Davis, 21a Pennyletts Garden, Stoke Poges, Buckinghamshire; Peter Pressner, 525 Bath Road, Slough, Buckinghamshire, both of England

[22] Filed: Feb. 10, 1975

[21] Appl. No.: 548,766

[30] Foreign Application Priority Data
Feb. 12, 1974 United Kingdom............... 6372/74

[52] U.S. Cl. ........................... 236/46 R; 236/91 G; 62/157
[51] Int. Cl.² ......................................... F23N 5/20
[58] Field of Search ............ 236/46, 91; 165/28; 62/157

[56] References Cited
UNITED STATES PATENTS
2,333,319  11/1943  Kucera ............................ 236/91 R
2,871,869  2/1959  Howard ........................... 236/46 X

*Primary Examiner*—William E. Wayner
*Attorney, Agent, or Firm*—Kirschstein, Kirschstein, Ottinger & Frank

[57] ABSTRACT

A control means for regulating the operation of a system for controlling the temperature within an enclosure so that a desired temperature within the enclosure is attained at a predetermined time wherein the switch on time of a thermal conditioning apparatus for the enclosure is increasingly delayed as the temperature outside the enclosure changes towards the desired temperature, so as to avoid the thermal conditioning apparatus being switched on earlier than necessary before said predetermined time.

13 Claims, 4 Drawing Figures

SYSTEMS FOR CONTROLLING THE TEMPERATURE WITHIN AN ENCLOSURE

This invention relates to systems for controlling the temperature within an enclosure such as a building or the like.

Such a system normally comprises a thermal conditioning apparatus, i.e. apparatus for cooling and/or heating the enclosure, together with control means for regulating the operation of the thermal conditioning apparatus.

It is a common practice to try to design such a system so that the temperature within the enclosure is maintained at a desired value during certain predetermined periods, but that outside the predetermined periods the control means allows the thermal conditioning apparatus to remain inoperative for as long as possible consistent with preventing the enclosure temperature from departing outside predetermined limits. By this means the consumption of energy by the thermal conditioning apparatus is kept to a minimum.

One particular difficulty in meeting such a design requirement is determination of the optimum time to switch on the thermal conditioning apparatus before a predetermined period in order to bring the enclosure to the desired temperature by the beginning of that predetermined period.

An important factor in this difficulty is the variation of optimum switch on time with the temperature outside the enclosure.

For example, in a known building central heating system a temperature time set point signal is generated which, throughout a period preceding each predetermined period, approaches a value corresponding to the temperature required during that predetermined period, attaining that value at the beginning of the period, and a heating apparatus is brought into operation when a signal representing the temperature within the enclosure equals the temperature time set point signal. With such a system the heating apparatus will switch on before the beginning of the next predetermined period for a pre-heat period whose duration depends on the enclosure temperature, i.e. the higher the enclosure temperature the shorter the pre-heat period. Nevertheless, it is found that, because the rate of enclosure temperature rise when the heating apparatus is on varies with the temperature outside the enclosure, for relatively high outside temperatures the heating apparatus tends to be switched on earlier than is necessary, with consequent waste of energy, or alternatively, the required temperature is not attained by the beginning of the predetermined period for relatively low outside temperatures.

It is an object of the present invention to provide a control means for regulating the operation of the thermal conditioning apparatus of a system for controlling the temperature within an enclosure whereby the above-mentioned difficulty is overcome.

According to the present invention a control means for regulating the operation of a system for controlling the temperature within an enclosure so that a desired temperature within the enclosure is attained at a predetermined time comprises: first means for generating a first signal representative of the temperature within the enclosure; second means for generating a second signal representative of a temperature set point which changes at a predetermined rate prior to said predetermined time and equals said desired temperature at said predetermined time; third means for generating a third signal representative of the temperature outside the enclosure; and fourth means for bringing a thermal conditioning apparatus for the enclosure into operation in response to the existence of a particular relation between said first and second signals, said particular relation between said first and second signals varying with said third signal so as increasingly to delay the operation of the thermal conditioning apparatus as the outside temperature changes towards said desired temperature.

In a preferred arrangement in accordance with the invention said relation is arranged to vary also with said first signal so that said delay decreases as the temperature within the enclosure changes towards said desired temperature.

In an arrangement in accordance with the invention said relation is preferably such that, the delay in operation of the thermal conditioning apparatus occurs after the set point temperature equals the enclosure temperature.

One system for controlling the temperature within an enclosure incorporating a control means in accordance with the invention will now be described, by way of example, with reference to the accompanying drawings in which.

Figure 1:
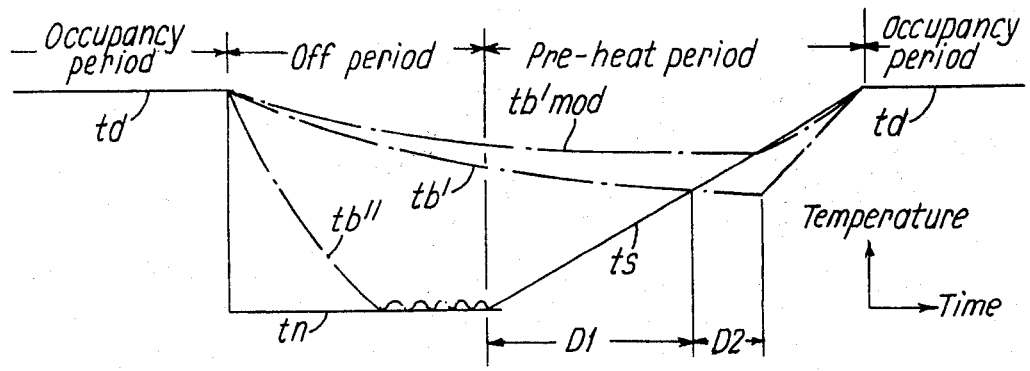
FIG. 1 is a graph illustrating the performance of the system.

The system to be described is a building heating system. The control means regulates the operation of a heating apparatus to control the temperature within the building tb in a manner illustrated in FIG. 1. Referring to FIG. 1, between occupancy periods of the building there occur, in sequence, an off period and a pre-heat period. During the occupancy period, e.g. 9 a.m. to 6 p.m., occupancy period circuits of the control means regulate operation of the heating apparatus so as to maintain the building temperature tb at a desired value td hereinafter called the day set temperature. This part of the control means is not relevant to the present invention and will not therefore be further described.

The occupancy period is followed by the off period during which the control means operates the heating apparatus only as necessary to prevent the building temperature tb falling below a predetermined minimum temperature tn, hereinafter called the night set temperature. Thus, if the building temperature tb falls only a small amount during the off period along the line tb' in FIG. 1 the heating apparatus will never be turned on during the off-period. If the building temperature falls relatively rapidly along line tb'' in FIG. 1, the heating apparatus is operated intermittently to prevent the building temperature falling appreciably below the night set temperature tn.

The off period is followed by the pre-heat period during which the control means switches on the heating apparatus at such a time as to raise the building temperature just to the day set temperature by the beginning of the following occupancy period. The control means is designed in accordance with the invention to prevent the day set temperature td being reached before the occupancy period despite variations in the temperature outside the building.

This is achieved by generation of a temperature/time set point signal representative of a set point temperature ts which rises linearly during the whole pre-heat period from the night set temperature tn to the day set temperature td. The heating apparatus is brought into operation when the set point temperature ts and the building temperature tb are in a particular relationship depending on the temperature outside the building to, and depending also on the difference between the building temperature tb and the day set temperature td. This relationship is such that, when appropriate, switch on of the heating apparatus is delayed after the beginning of the pre-heat period by an amount D1 depending on the amount the building temperature tb is above the night set temperature tn and by a further amount D2 directly dependent on the amount the outside temperature to is above a predetermined value to min, and on the amount the building temperature tb is below the day set temperature td.

The effect of this is that the heating apparatus is brought into operation when the set point temperature ts reaches a value equal to the building temperature modified in dependence on outside temperature to a degree dependent on building temperature. The modified version of building temperature line tb' is referenced tb' mod in FIG. 1.

It will be appreciated that the pre-heat period must be made long enough for the heating apparatus to be able to raise the building temperature to the day set temperature td from the chosen night set temperature tn by the end of the pre-heat period. Hence, provision is made for variation of the duration of the pre-heat period. Provision is also made for an extended pre-heat period after a longer than usual off period, e.g. on Monday morning after an off period extending from the end of the previous Friday occupancy period.

In the particular apparatus being described a maximum pre-heat period of up to 9 hours can be chosen. Provision for extension of the pre-heat period by up to 3 hours is made, but the total pre-heat period cannot exceed 9 hours.

The control means and the manner in which it achieves the above-described control of the building temperature will now be described.

Figure 2:
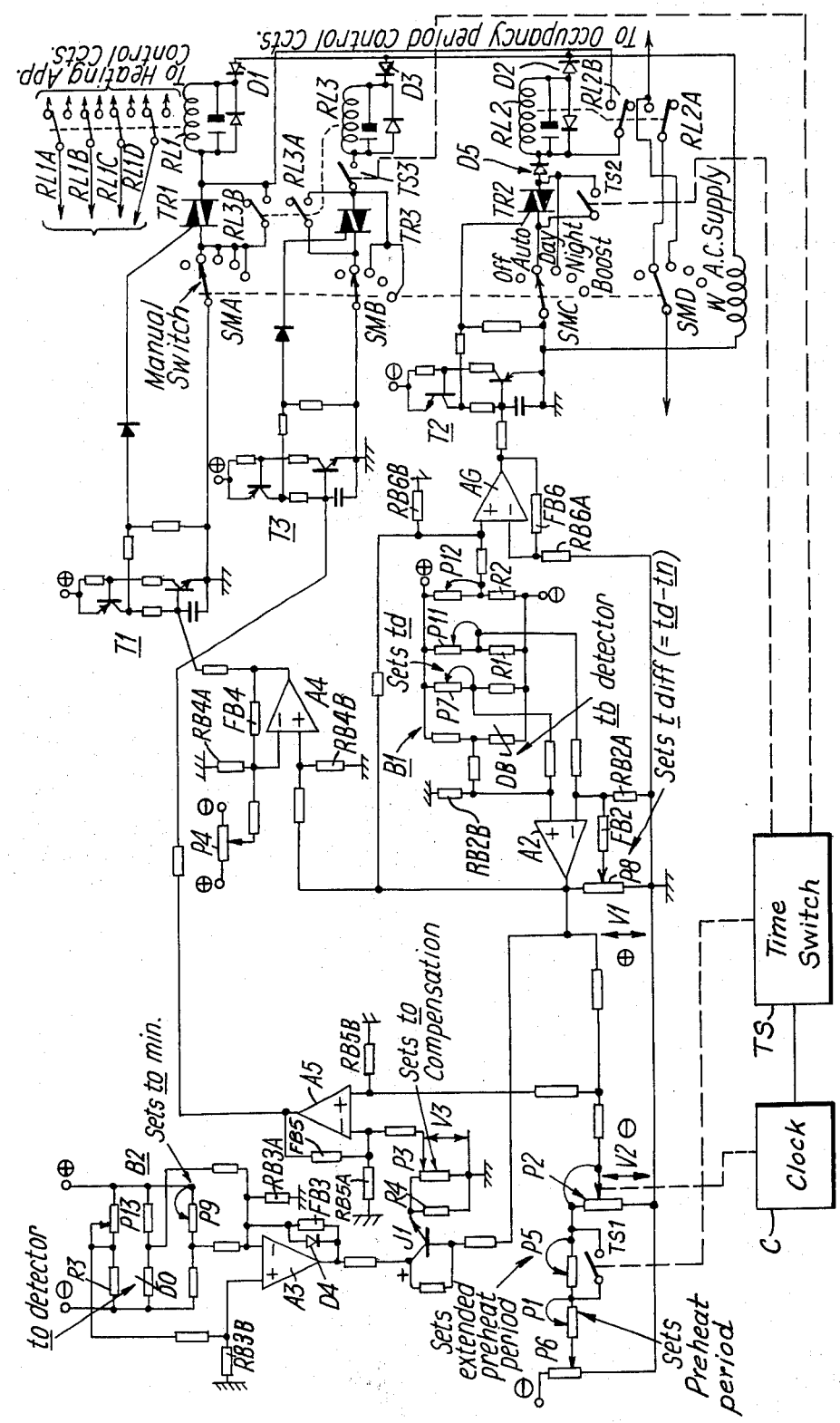
FIG. 2 is a schematic circuit diagram of the control means.

Referring to FIG. 2, the control means includes five high-gain differential d.c. amplifiers A2 to A6 each of which has inverting and non-inverting inputs connected to ground via respective biassing resistors RB2A and RB2B, RB3A and RB3B, RB4A and RB4B, RB5A and RB5B, or RB6A and RB6B, and each of which is provided with negative feedback by means of a resistor FB2, FB3, FB4, FB5, or FB6 connected between its output and its inverting input.

The non-inverting input of the amplifier A2 is supplied with an input signal from a conventional d.c. voltage energised bridge B1 incorporating a detector DB for the building temperature tb in one arm and a potentiometer P7 in the other arm which is set according to the required day set temperature td. The inverting input of the amplifier A2 is connected to the output of the amplifier via the feedback resistor FB and a potentiometer P8 which is set according to a chosen difference t diff between the day and night set temperatures td and tn so that the amplifier output V1 is +2 volts when the building temperature tb equals the night set temperature tn. The output V1 falls linearly with rising building temperature so as to just become negative when the building temperature tb equals the day set temperature td, the output V1 thus being representative of the building temperature. The value of V1 when tb equals td is set by a potentiometer P11 connected in series with a resistor R1 across the energising voltage for the bridge B1, the junction between P11 and R1 being connected to the inverting input of amplifier A2.

The output V1 of the amplifier A2 is applied to the respective non-inverting inputs of amplifiers A4 and A6.

Considering first amplifier A6, the output of amplifier A6 changes polarity when V1 just becomes negative, that is when the building temperature tb equals the day set temperature td, the output of the amplifier A6 in this condition being set by a potentiometer P12 connected in series with a resistor R2 across the bridge energising voltage, the junction of R2 and P12 being connected to the non-inverting input of amplifier A6. This change in polarity of the output of amplifier A6 fires a triac TR2, via a trigger circuit T2, so as to energise a relay RL2 whose contacts RL2A and RL2B are thereby closed. In normal operation this occurs at the end of each pre-heat period whereupon the closure of contacts RL2A brings into operation the occupancy period control circuits to maintain the building temperature tb at the day set value td throughout the occupancy period. The closure of contacts RL2B latches the relay RL2 in its energised condition via contacts RL3B of a relay RL3. As is further explained below, the relay RL3 is energised to close the contacts RL3B at some time during the pre-heat period, the contacts remaining closed until the end of the occupancy period. Thus relay RL2 is energised from the first moment in a pre-heat period that the building temperature tb equals the day set temperature td until the end of the occupancy period. A pair of contacts TS2 of a time switch TS operated by a clock C incorporated in the control means are connected across the triac TR2 and are arranged to be closed throughout the occupancy period to ensure that RL2 is energised throughout the occupancy period and the occupancy period control circuits are brought into operation.

At the end of the occupancy period the occupancy period circuits relinquish control of the heating apparatus allowing the building temperature to fall towards the outside temperature to during the 'off' period. Operation of the heating apparatus as necessary during the off period to prevent the building temperature tb falling below the night set temperature tn is effected by means of the amplifier A4 to whose non-inverting input the signal V1 is applied. The inverting input of amplifier A4 is biassed from a potentiometer P4 to just below −2 volts so that the output of amplifier A4 changes polarity when V1 just exceeds +2 volts, i.e. when the building temperature tb falls just below the night set temperature tn. This fires a triac TR1 via a trigger circuit T1 to energise a relay RL1 whose contacts RL1A, RL1B, RL1C and RL1D close to switch on the heating apparatus. When the heat output of the heating apparatus has caused V1 to fall just below +2 volts the polarity of the output of amplifier A4 again changes cutting off the triac TR1 and de-energising the relay RL1. The building temperature tb is thus maintained approximately at the night set temperature tn.

Switch on of the heating apparatus at an appropriate time during the pre-heat period is effected by means of the amplifier A5.

The signal applied to the non-inverting input of the amplifier is proportional to the difference between the magnitudes of the signal V1 and a negative voltage signal V2 which is the temperature time set point signal and has a value representative of the temperature set point ts.

The signal V2 is derived from the tapping point of a potentiometer P2. One end of the potentiometer P2 is grounded and the other end is connected to its tapping point and via potentiometers P1 and P5 connected as variable resistors to the tapping point of a further potentiometer P6 which is connected across a source of negative potential. The potentiometer P6 is adjusted so that with potentiometer P5 set to give zero series resistance and the potentiometer P1 set to give maximum series resistance the ungrounded end of potentiometer P2 is at −2 volts.

The tapping point of the potentiometer P2 is operated by a cam driven by the control means clock C so as to move linearly from the ungrounded to the grounded end of potentiometer P2 during the 9 hour maximum possible pre-heat period. Hence, with P1 set at maximum resistance, V2 changes from a value of −2 volts at a time 9 hours before the beginning of the occupancy period to a value of 0 volts at the beginning of the occupancy period. By decreasing the effective series resistance of potentiometer P1 the time before the beginning of the occupancy period at which V2 has a value of −2 volts can be reduced. As is further explained below, the pre-heat period effectively begins when V2 has a value of −2 volts so that potentiometer P1 sets the duration of the pre-heat period. The potentiometer P5 is set similarly according to the required duration of the extended pre-heat period, potentiometer P5 being shorted by further contacts TS1 of the time switch TS which are arranged to open only when an extended pre-heat period is required.

The inverting input of the amplifier A5 is connected to the tapping point of a potentiometer P3 to effect compensation for outside temperature rise, but this connection will for the moment be ignored.

Without outside temperature compensation the polarity of the output of amplifier A5 changes when V2 + V1 becomes positive i.e. when the set point temperature ts becomes just greater than the building temperature tb. This fires a triac TR3 via a trigger circuit T3 and energises the relay RL3 via contacts TS3 of the time switch TS which are arranged to be closed from the beginning of the maximum possible pre-heat period to the end of the occupancy period. On energisation of relay RL3 contacts RL3A are closed to latch the relay RL3 in its energised condition, and contacts RL3B are closed to energise relay RL1, thereby switching on the heating apparatus via contacts RL1A, RL1B, RL1C and RL1D. Hence relay RL1 is energised from the first moment in a pre-heat period that the set point temperature ts exceeds the building temperature tb and remains energised until the end of the occupancy period.

Hence, without outside temperature compensation, if the building temperature tb is at the night set temperature tn at the end of the off period, ts exceeds tb (i.e. V1 + V2>0) and the heating apparatus switches on just after the beginning of the pre-heat period. If the building temperature tb is above the night set temperature tn at the end of the off period (i.e. V1 is less than V2) a delay D1 occurs after the end of the off period before ts exceeds tb and the heating apparatus switches or, the delay being dependent on the difference between the building temperature tb and the night set temperature tn.

To provide compensation for outside temperature to, a signal representative of outside temperature to is produced at the output of the amplifier A3. The inverting input of amplifier A3 is supplied with an input signal from a conventional bridge B2 incorporating an outside temperature detector D0 in one arm and a potentiometer P9 in the other arm which is set according to the outside temperature to min above which compensation for outside temperature is required. The output of the amplifier A3 is a positive voltage whose value varies proportionally with the amount the outside temperature to is above the temperature to min. The output of the amplifier A3 when to equals to min is set by a potentiometer P13 connected in series with a resistor R3 across the energising voltage for the bridge B2, the junction between P13 and R3 being connected to the noninverting input of the amplifier A3. To confer a unidirectional characteristic on the amplifier A3 its feedback resistor FB is shunted by a rectifier diode D4.

The output of the amplifier A3 is applied to the inverting input of the amplifier A5 via a variable impedance controlled by the voltage V1. To this end the output of the amplifier A3 is connected to the collector of an NPN transistor J1 whose emitter is connected to ground via a resistor R4, and whose base is biassed by the output V1 of the amplifier A2. The potentiometer P3 is connected across the resistor R4 so that the inverting input of the amplifier A5 is positively biassed by voltage V3 which is a proportion of the emitter voltage of the transistor J1 determined by the setting of the potentiometer P3.

With this arrangement the emitter voltage of transistor J1 has a positive value which varies directly with the temperature difference to − to min and with the temperature difference tb − td, being zero for all values of to − to min when tb is equal to td. Hence the positive voltage V3 at the inverting input of the amplifier A5 increases with increase of outside temperature to above to min to a degree which decreases as the building temperature tb approaches the day set temperature td.

The positive bias voltage V3 on the inverting input of amplifier A5 causes the firing of triac TR3 to be further delayed until (V1 + V2) at the non-inverting input of amplifier A5 has a value equal to the positive bias voltage V3. Hence switch on of the heating apparatus during the pre-heat period is correspondingly further delayed by a period D2 beyond period D1 when the outside temperature rises above to min.

It will be appreciated that the setting of the potentiometer P3 determines the amount of further delay D2. The potentiometer P3 may conveniently be calibrated in delay hours required per 10°C rise in outside temperature to above the value of to min for a building temperature tb equal to the night set temperature tn. This delay pre-set by potentiometer P3 will then be automatically reduced as and when the building temperature tb approaches td.

Figure 3A:
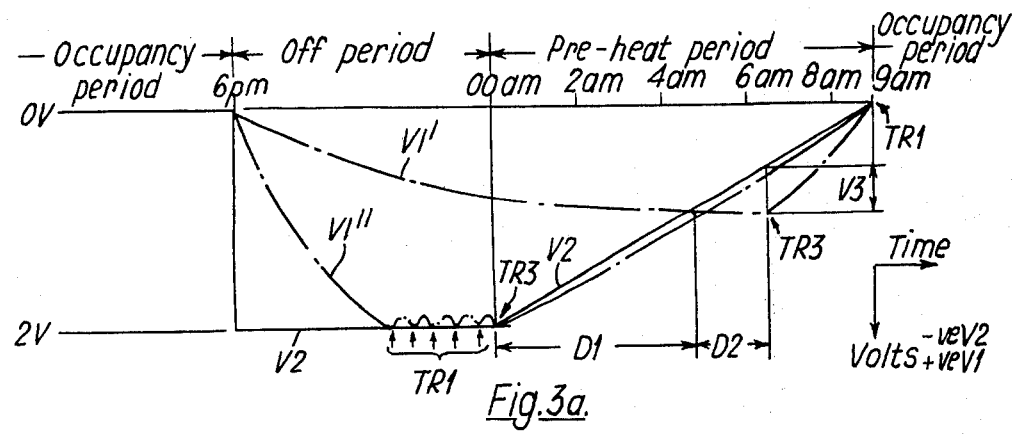
FIGS. 3a and 3b are graphs illustrating the variation of various signals generated in the control means.
Figure 3B:
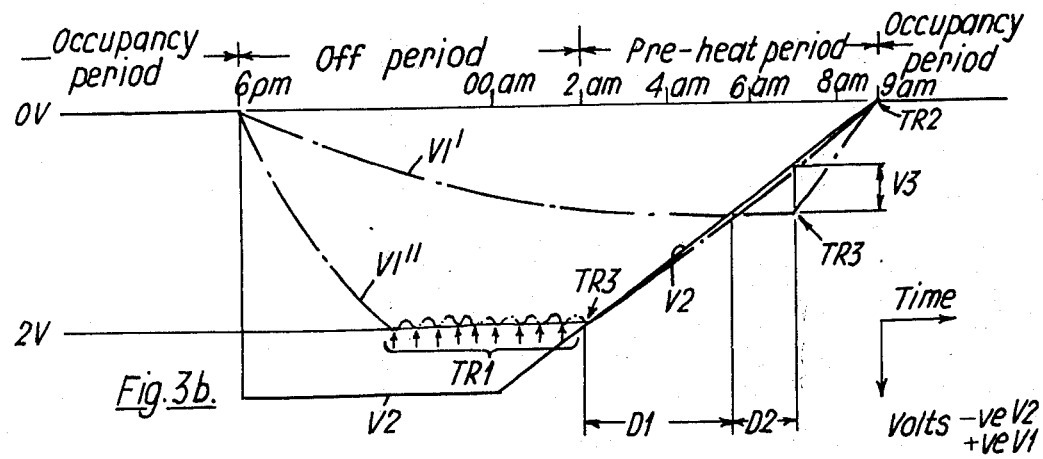

FIGS. 3a and 3b show the way in which signals V1 and V2 might change with time in operation in a system having an occupancy period from 9 a.m. to 6 p.m. with pre-heat periods of nine hours (FIG. 3a) and seven hours (FIG. 3b). Lines V1" show the variation of V1 when the building temperature tb falls to the night set temperature tn before the pre-heat period, and lines V1' show the variation of V1 when the building temperature tb never falls to the night set temperature and outside temperature compensation due to V3 occurs. The times of firing of triacs TR1, TR2 and TR3 are also shown in FIGS. 3a and 3b.

In FIG. 3 the tapping points of the potentiometer P2 is taken to be returned to the ungrounded end of potentiometer P2 by its operating cam at the end of the occupancy period, but this can of course occur at any convenient time outside the pre-heat period.

It will be appreciated that a control means in accordance with the invention will normally include provision for allowing the system to operate in other than the automatic mode of operation described above. The ganged switches SMA, SMB and SMC in FIG. 2 allow the system to be switched out of automatic mode into day mode, when the day control circuits take permanent control, into night mode when the system operates as described above during the off period, into boost mode when the heating apparatus is permanently on, and into a system off condition.

The relays RL1, RL2 and RL3 are energised via respective rectifier diodes D1, D2 and D3 from a low voltage a.c. supply produced across a transformer winding W. The diode D2 is oppositely poled with respect to the diodes D1 and D3 so that the relay RL2 is energised by the negative half-cycles only of the a.c. supply and relays RL1 and RL3 are energised by the positive half-cycles only of the a.c. supply. In addition a further diode D5 poled in like manner to the rectifier D2 is connected between the triac TR2 and the relay RL2. By this means switch TS2 and triac TR2 are prevented from energising relay RL1 via contacts RL2B.

As mentioned above the relay RL2 latches via contacts RL2B only when the relay RL3 is operated i.e. during the pre-heat and occupancy periods. Thus, in the event of the building temperature tb rising above the day set temperature td during the off-period the relay RL2 although energised via triac TR2, does not latch via contacts RL2B and will thus de-energise when the building temperature tb falls below the day set temperature td and TR2 turns off. The possibility of relay RL2 latching via triac TR3 and contacts RL2B does not exist since the contacts RL2B can only be closed by firing triac TR2 and a firing signal for triac TR3 cannot co-exist with a firing signal for triac TR2.

We claim:

1. A control means for regulating the operation of a system for controlling the temperature within an enclosure so that a desired temperature within the enclosure is attained at a predetermined time, the control means comprising:
   I. thermal conditioning apparatus for said enclosure;
   II. first means for generating a first signal representative of the temperature within the enclosure;
   III. second means for generating a second signal representative of a temperature set point which changes at a predetermined rate prior to said predetermined time and equals said desired temperature at said predetermined time;
   IV. third means for generating a third signal representative of the temperature outside the enclosure; and
   V. fourth means connected with said first, second and third means for bringing said thermal conditioning apparatus into operation in response to the existence of a particular relation between said first and second signals,
   VI. said particular relation between said first and second signals varying with said third signal so as increasingly to delay the operation of the thermal conditioning apparatus as the outside temperature changes towards said desired temperature.

2. A control means according to claim 1 wherein said relation is arranged to vary also with said first signal so that said delay decreases as the temperature within the enclosure changes towards said desired temperature.

3. A control means according to claim 2 wherein said relation is such that, the delay in operation of the thermal conditioning apparatus occurs after the set point temperature equals the enclosure temperature.

4. A control means according to claim 1 including fifth means connected with said first means for bringing said temperature conditioning apparatus into operation when said enclosure temperature, as represented by said first signal, differs from said desired temperature by a selected temperature difference thereby preventing said enclosure temperature from differing from said desired temperature by more than said selected temperature difference.

5. A control means according to claim 1 including sixth means connected with said first means for bringing into operation a further control means when said desired temperature within the enclosure is attained, said further control means being arranged to control said thermal conditioning apparatus so as to maintain said temperature within the enclosure substantially at said desired temperature.

6. A control means according to claim 1 wherein said first, second and third signals are voltages whose magnitudes are respectively representative of said enclosure temperature; said set point temperature and said outside temperature, and said fourth means is adapted to bring said thermal conditioning apparatus into operation when the difference between said first and second signals is substantially equal to the third signal.

7. A control means according to claim 6 wherein said fourth means comprises a differential amplifier to whose inputs the difference between said first and second signals and said third signal are respectively applied.

8. A control means according to claim 6 including fifth means connected with said first means for bringing said temperature conditioning apparatus into operation when said enclosure temperature, as represented by said first signal, differs from said desired temperature by a selected temperature difference thereby preventing said enclosure temperature from differing from said desired temperature by more than said selected temperature difference, and wherein said first means comprises: a differential amplifier; a circuit arrangement for supplying to one input of said amplifier a voltage representative of the difference between the enclosure temperature and said desired temperature; and a circuit arrangement for supplying to the other input of said amplifier a voltage representative of said selected temperature difference; whereby the output of said amplifier changes substantially linearly with enclosure temperature between a first value when the enclosure temperature equals the desired temperature and a second value when the enclosure temperature differs from said desired temperature by said selected temperature difference.

9. A control means according to claim 6 wherein said second means comprises a variable resistance arrangement operated by a timing mechanism.

10. A control means according to claim 7 wherein said third means comprises: a differential amplifier; a circuit arrangement for supplying to one input of said amplifier a voltage representative of the difference between the outside temperature and a predetermined temperature; and means for supplying to the other input of the amplifier a voltage representative of said predetermined temperature, whereby the output of said amplifier represents the difference between said outside temperature and said predetermined temperature.

11. A control means according to claim 10 wherein the output signal of said third means amplifier is applied to the input of said fourth means amplifier via a variable impedance controlled by said first signal, whereby said particular relation varies with said first signal so that said delay decreases as the temperature within the enclosure changes towards said desired temperature.

12. A control means according to claim 6 including fifth means connected with said first means for bringing said temperature conditioning apparatus into operation when said enclosure temperature, as represented by said first signal, differs from said desired temperature by a selected temperature difference thereby preventing said enclosure temperature from differing from said desired temperature by more than said selected temperature difference, said fifth means comprising: a differential amplifier; means for applying said first signal to one input of said amplifier; and means for applying a voltage representative of said selected temperature difference to the other input of said amplifier; whereby the amplifier output changes polarity when said enclosure temperature differs from said desired temperature substantially by said selected temperature difference.

13. A control means according to claim 6 including sixth means connected with said first means for bringing into operation a further control means when said desired temperature within the enclosure is attained, said further control means being arranged to control said thermal conditioning apparatus so as to maintain said temperature within the enclosure substantially at said desired temperature, said sixth means comprising: a differential amplifier; means for applying said first signal to one input of said amplfier; and means for applying a voltage representative of said desired temperature to the other input of said amplifier; whereby the amplifier output changes polarity when said enclosure temperature substantially equals said desired temperature.

* * * * *